United States Patent

Sudo et al.

[11] Patent Number: 5,994,465
[45] Date of Patent: Nov. 30, 1999

[54] RUBBER COMPOSITION CONTAINING AN ORGANIC COMPOUND HAVING TWO MALEIMIDE GROUPS AND A RUBBER ARTICLE FOR PHARMACEUTICALS AND MEDICAL TREATMENT

[75] Inventors: Morihiro Sudo, Sumida-ku; Tomoyasu Muraki, Abiko; Eiji Kawachi, Kiryu; Yasushi Kawachi, Ashikaga, all of Japan

[73] Assignee: Daikyo Gomu Seiko, Ltd., Tokyo, Japan

[21] Appl. No.: 09/081,643

[22] Filed: May 20, 1998

Related U.S. Application Data

[62] Division of application No. 08/151,207, Nov. 12, 1993, abandoned, which is a continuation of application No. 07/748,068, Aug. 21, 1991, abandoned.

[30] Foreign Application Priority Data

Aug. 24, 1990 [JP] Japan ..................................... 2-221064
Jan. 14, 1991 [JP] Japan ..................................... 3-15995

[51] Int. Cl.$^6$ ........................... C08L 47/00; C08C 19/25; C08C 19/22

[52] U.S. Cl. .......................................... 525/105; 525/282

[58] Field of Search ................................... 525/105, 286, 525/288, 291, 332.5, 342, 282

[56] References Cited

U.S. PATENT DOCUMENTS

| | | | |
|---|---|---|---|
| 2,925,407 | 2/1960 | Goldberg | 525/282 |
| 3,835,075 | 9/1974 | Boutsicaris | 525/332.5 |
| 4,136,132 | 1/1979 | Poole | 525/288 |
| 4,444,948 | 4/1984 | Hochstrasser | 525/288 |
| 5,010,137 | 4/1991 | Umeda | 525/104 |

FOREIGN PATENT DOCUMENTS

| | | |
|---|---|---|
| 210919 | 11/1984 | Japan . |
| 1014853 | 4/1983 | U.S.S.R. . |

*Primary Examiner*—Christopher Henderson
*Attorney, Agent, or Firm*—Wenderoth, Lind & Ponack, L.L.P.

[57] ABSTRACT

There is provided a rubber composition and a rubber article for pharmaceutical chemicals or medical treatments, obtained by forming and cross-linking this rubber composition, the rubber article having very excellent properties which can be adapted to the standard test values of various official documents, required in this field, and can further satisfy the test items having lately become an important problem from the pharmaceutical standpoint. This rubber composition comprises 0.3 to 3.5 parts by weight of an organic peroxide cross-linking agent, 0.3 to 4 parts by weight of an organic compound having at least 2 maleimide groups in one molecule and optionally, 0.6 to 30 parts by weight of an organosilicone compound per 100 parts by weight of a isobutylene-isoprene copolymer rubber.

4 Claims, 1 Drawing Sheet

RUBBER COMPOSITION CONTAINING AN ORGANIC COMPOUND HAVING TWO MALEIMIDE GROUPS AND A RUBBER ARTICLE FOR PHARMACEUTICALS AND MEDICAL TREATMENT

This application is a divisional application of Ser. No. 08/151,207, filed Nov. 12, 1993, now abandoned which is a continuation application of Ser. No. 07/748,068, filed Aug. 21, 1991, now abandoned.

BACKGROUND OF THE INVENTION

1. Field of the Invention

This invention relates to a rubber composition and a rubber article for pharmaceutical chemicals or medical treatments, obtained by forming and cross-linking this rubber composition, the rubber article having very excellent properties which can be adapted to the standard test values of various official documents, required in this field, and can further satisfy the test items having lately become an important problem from the pharmaceutical standpoint, and the rubber article further having good economical property.

2. Description of the Prior Art

As materials of containers for pharmaceuticals or devices for medical treatment, there have lately been used plastics in addition to glasses having been used from old times, and rubber articles have often been used as sealing materials thereof. High grade sanitary property and safety are required of the rubber articles in this field from the standpoint of influences on the human body. To this end, various test methods or quality standards are provided, for example, Test method of a rubber stopper for liquor transfusion or a plastic container for liquor transfusion of "11th Revision, Japanese Pharmacopoeia" (hereinafter referred to as JP 11), Standards of Medical Appliances such as "Appliance Standards for Artificial Kidney of Dialytic Type" according to Official Notification No. 494 of the Ministry of Health and Welfare, and those provided by the International Standards Organization (ISO), European Pharmacopoeia (EP), US Pharmacopoeia XXI (USP), West Germany Industrial Standard DIN 58, 366-58, 368 (DIN), British Standard 3263 (BS), etc. Furthermore, test items corresponding to the higher grade standards have lately been taken into consideration.

As these sealing materials, there have been proposed vulcanized isoprene-isobutylene rubbers (hereinafter referred to as IIR), rubber stoppers of isoprene rubbers (hereinafter referred to as IR) blended with polyethylene fine powder (Japanese Patent Publication No. 8789/1970), vulcanized butadiene rubber (hereinafter refrred to as BR) (Japanese Patent Publication No. 16409/1978), a rubber composition comprising an ethylene-propylene-non-conjugated diene ternary copolymer rubber (hereinafter referred to as EPDM) blended with zinc oxide, capable of passing Official Notification No. 434 of the Ministry of Health and Welfare (Japanese Patent Laid-Open Publication No. 157842/1983), a composition for a medical container using natural rubber (Japanese Patent Laid-Open Publication No. 99143/1985), etc. Above all, IIR is preferred because of its non-permeability of gases such as oxygen, nitrigen, etc, and moisture and its chemical inactivity, i.e. stability to acids, alkalies or chemicals.

Vulcanization of IIR has hitherto been carried out by the use of a cross-linking agent such as of sulfur or thiuram type, metal dithiocarbamates, quinoids, etc., or by resin cross-linking with phenol resins, etc. A rubber stopper consisting of the material obtained according to such cross-linking methods is not preferred because of contaminating pharmaceuticals through elution from the rubber stopper.

Thus, a zinc oxide-free rubber article for pharmaceuticals or for medical treatment and an improved one are proposed so as to remove, in particular, zinc of physiologically harmful chemical eluates (Japanese Patent Laid-Open Publication Nos. 183858/1982 and 216058/1983).

Cross-linking of IIR with organic peroxides is difficult because of causing collapsing or depolymerization, as well known in the art.

As compounds known from old times as organic peroxide cross-linking agents for rubbers or resins, there are dicumyl peroxide (DCP), benzoyl peroxide (BPO), etc. An example of using DCP for cross-linking IIR has been reported [① Oxley and Wilson, "Rubber Chemistry and Technology" Vol. 42, p.1147–1154 (1964), ② Imoto, Minoura and others, "Nippon Rubber Kyokaishi" Vol. 41, p.1004–1011 (1968)] and an example of using jointly DCP and maleimide compounds [③ Tawney and Wenisch, "Rubber Chemistry and Technology" Vol. 38, p.352–366 (1965)] has also been reported. However, rubber articles which can be put to practical use have not been obtained. Thereafter, it is only reported that cross-linking of IIR with organic peroxides is impossible.

Furthermore, methods have been proposed which comprise reacting and modifying ing IIR with chlorine, bromine or divinylbenzene to obtain a chlorinated butyl rubber (CIIR), brominated butyl rubber (BIIR) or divinylbenzene-modified butyl rubber (DIIR), which is then cross-linked with an organic peroxide ((Japanese Patent Publication Nos. 37824/1985, 46420/1975, 43865/1985), but the rubber articles obtained thereby are used as rubber vibration insulators and are not satisfactory, as a sanitary rubber article, in respect of chemical and physical properties.

The inventors have proposed sanitary rubber articles obtained by cross-linking rubbers each consisting of a mixture of a butyl rubber with a synthetic rubber of diene type or polyethylene, in Japanese Patent Laid-Open Publication No. 133347/1977 and further sanitary rubber articles each consisting of a mixture of IIR, CIIR or BIIR with fine powder of polyethylene of superhigh molecular weight, in Japanese Patent Laid-Open Publication No. 144346/1985.

Bonding methods comprising cross-linking IIR with organic peroxides and maleimides at a low temperature have been proposed in Japanese Patent Laid-Open Publication Nos. 90546/1977, 92343/1985, 130665/1985 and 130668/1985, but these methods have also disadvantages that the rubber article obtained therefrom is not satisfactory as a sanitary article because of tendency of discoloration, containing organic metal salts and inorganic metal salts and having a large problem on physical properties, e.g. compressive strain and heat resistance. In addition, there is no example of using a maleimide group-containing compound for forming a rubber article for pharmaceuticals or for medical treatment.

The articles of the prior art, described in the above described publications, are suitable for use as a sanitary article in some respects, but are not satisfactory in other respects. The reasons therefor probably consist in that cross-linking and shaping of IIR is very difficult. If this problem can be solved, therefore, it is expected to obtain a rubber article having physical and chemical properties suitable for use in the field of the present invention.

SUMMARY OF THE INVENTION

It is an object of the present invention to provide an improved rubber composition suitable for obtaining a rubber article for pharmaceuticals and medical treatment.

It is another object of the present invention to provide a novel rubber composition comprising IIR as a predominant component.

It is a further object of the present invention to provide a rubber article for pharmaceuticals and medical treatment, which is obtained by shaping and cross-linking the above described rubber composition and has high grade sanitary property capable of passing the standard values in the various test methods provided according to JP11, ISO, USP, BS, EP and DIN and passing also higher grade test methods than these official tests methods.

These objects can be attained by a rubber composition comprising 0.3 to 3.5 parts by weight of an organic peroxide cross-linking agent and 0.3 to 4 parts by weight of an organic compound having at least 2 maleimide groups in one molecule per 100 parts by weight of a isobutylene-isoprene copolymer rubber and a rubber article for pharmaceuticals and medical treatment, which is obtained by shaping and cross-linking a rubber composition comprising 0.3 to 3.5 parts by weight of an organic peroxide cross-linking agent and 0.3 to 4 parts by weight of an organic compound having at least 2 maleimide groups in one molecule per 100 parts by weight of a isobutylene-isoprene copolymer rubber.

BRIEF DESCRIPTION OF THE DRAWINGS

The accompanying drawings are to illustrate the principle and the merits of the present invention in detail.

DETAILED DESCRIPTION OF THE INVENTION

Figure 1:
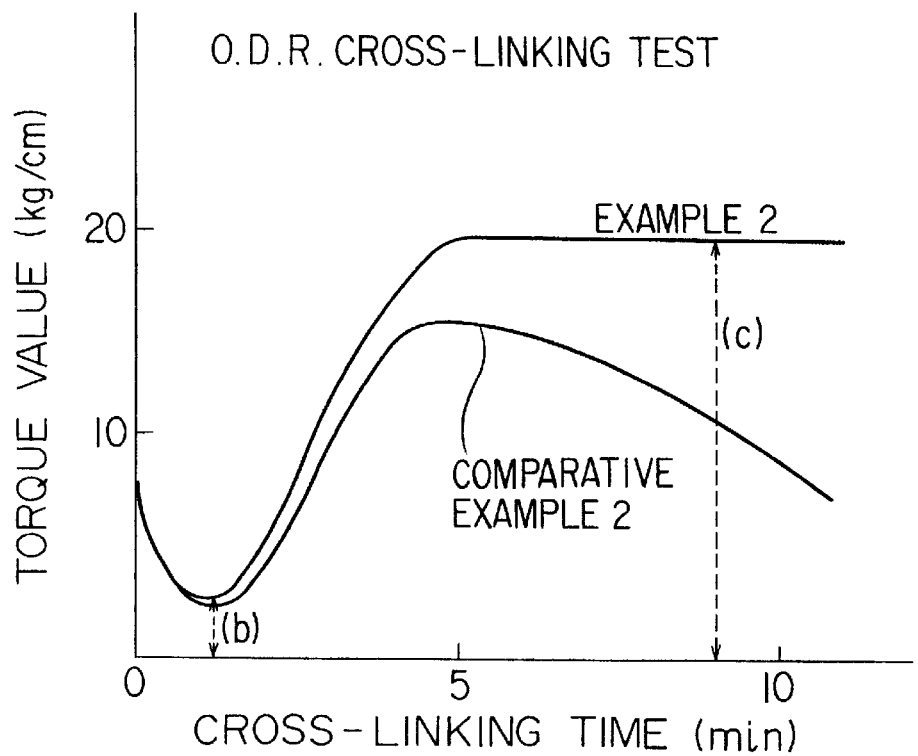
FIG. 1 is a graph showing the results of cross-linking tests of O.D.R. to compare Example 2 of the present invention and Comparative Example 2, the abscissa being time (min) and the ordinate being torque value (kg/cm).

In a prerred embodiment of the present invention, the above described organic peroxide cross-linking agent is selected from the group consisting of those of peroxyester type, peroxycarbonate type and peroxyketal type.

In addition, the present invention provides a rubber composition comprising 0.3 to 3.5 parts by weight of an organic peroxide cross-linking agent, 0.3 to 4 parts by weight of an organic compound having at least 2 maleimide groups in one molecule and 0.6 to 30 parts by weight of an organosilicone compound per 100 parts by weight of a isobutylene-isoprene copolymer rubber.

In the above described rubber articles for pharmaceuticals and medical treatment according to the present invention, preferably the hardness Hs (JIS spring type) of the shaped and cross-linked rubber is in the range of 25 to 55.

The feature of the rubber composition of the present invention consists in that IIR is mixed with predetermined amounts of an organic peroxide as a cross-linking agent and an organic compound having at least 2 maleimide groups in one molecule (hereinafter referred to as "maleimide compound") as an assistant, whereby IIR is cross-linked with an organic peroxide and maleimide compound to give excellent sanitary property and to obtain a rubber product having a favorable hardness as a sealing agent. In spite of using the maleimide group-containing cross-linking assistant, the rubber article excellent in sanitary property can be realized. Furthermore, it is also effective to use an organic silicone compound as an assistant in addition to the organic peroxide.

As IIR of the present invention, there can be used an isobutylene (95–99.5% by weight)-isoprene (0.5–5% by weight) copolymer having an unsaturation degree of 0.5 to 2.5 mol %, Mooney viscosity of 30 to 89 and average molecular weight of 15 to $64 \times 10^4$.

In the case of the rubber composition of the first invention using an organic peroxide as a cross-linking agent and a maleimide compound as a cross-linking assistant, as IIR, there can be used an isobutylene (97–99.5 weight %)-isoprene (0.5–3 weight %) copolymer having an unsaturation degree of 0.5 to 2.5 mol %, Mooney viscosity of 30 to 80 and average molecular weight of 15 to $64 \times 10^4$.

In the rubber composition or rubber article of the present invention, the content of IIR is preferably 55 to 87% by weight, since if less than 55% by weight, physical sanitary properties are disqualified, for example, permeability of oxygen, air and humidity and stripped fragments from the rubber surface are increased and the sealability with a vial mouth is deteriorated, while if more than 87% by weight, not only the quality of the product is inferior but also the workability in a process for the production thereof is deteriorated, for example, working of the product is difficult, the product tends to be deformed and handling of the product is hard because of its compressive strain and adhesiveness, so that an economical supply of the product be difficult.

As described above, cross-linking of IIR with an organic peroxide has hitherto been considered to be difficult, but the inventors have found that this is possible by the joint use of the particular organic peroxide and a maleimide compound.

In the present invention, organic peroxides such as of peroxyester type, peroxycarbonate type and peroxyketal type (all of which will hereinafter be referred to as "particular organic peroxide") are preferably used as the organic peroxide for crosslinking IIR as described above. Since the joint use of predetermined amounts of the particular organic peroxide and a compound having two or more maleimide groups in one molecule (maleimide compound) results in formation of a network structure among the rubber molecules rather than depolymerization or decomposition of IIR, there can be obtained a rubber article suitable for pharmaceuticals and medical treatment, the present invention aims, having excellent physical properties, sufficiently chemically sanitary property and suitable elasticity.

The particular organic peroxide used in the present invention will now be illustrated in detail.

Examples of the organic peroxide of peroxyester type (alkylperester: R—CO—O—O—R') are:

t-butylperoxy3,5,5-trimethylhexanoate t-butylperoxyisobutyrate t-butylperoxyacetate t-butylperoxy-2-ethylhexanoate 1,1,3,3-tetramethylbutylperoxy-2-ethylhexanoate

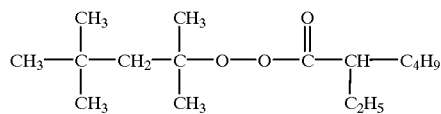

t-butylperoxy laurate t-butylperoxy benzoate
di-(t-butylperoxy) adipate

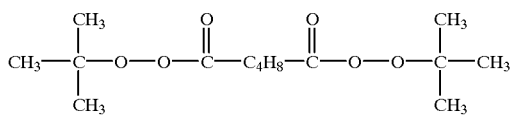

2,5-dimethyl-2,5-di(peroxy-2-ethylhaxonoyl)hexane

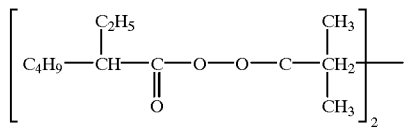

di(t-butylperoxy)isophthalate

Examples of the organic peroxide of peroxycarbonate type (RO—CO—COOR', RO—CO—OO—CO—OR") used in the present invention are:

bis(4-t-butyleyclohexylperoxy)dicarbonate

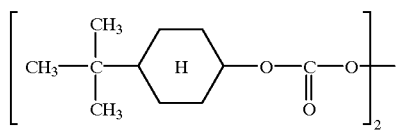

di(3-methoxybutylperoxy)dicarbonate

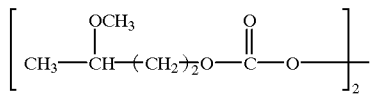

t-butylperoxyisopropylcarbonate
di(cyclohexylperoxy)dicarbonate

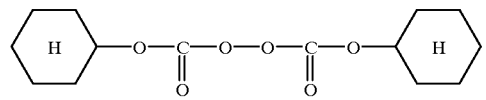

Examples of the organic peroxide of peroxyketal type:

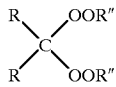

used in the present invention are:

2,2-di-t-butylperoxybutane
1,1-di-t-butylperoxycyclohexane
1,1-di-(t-butylperoxy)-3,3,5-trimethylcyclohexane
2,5-dimethyl-2,5-di(t-butylperoxy)hexane
2,5-dimethyl-2,5-di(t-butylperoxy)hexyne
1,3-di(t-butylperoxyisopropyl)benzene 2,5-dimethyl-2,5-dibenzoylperoxyhexane
2,5-dimethyl-2,5-di(peroxybenzoyl)hexyne-3

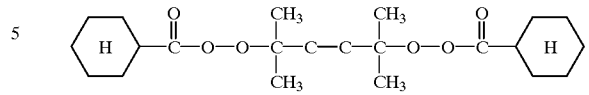

n-butyl-4,4-bis(t-butylperoxy)valerate

Of these organic peroxides, DCP (dialkyl peroxide type) and BPO (acyl peroxide type) are used as a cross-linking agent of resins such as polyethylene, ethylene-vinyl acetate resins, etc. or polymers such as EPM, etc., a polymerization catalyst, a hardening agent of unsaturated polyester resins and the like. In addition, there are hydroxyperoxide type compounds and ketoneperoxide type compounds, which are used as a polymerization catalyst of synthetic rubbers, resins, etc. or a hardening agent of unsaturated polyester resins. These organic peroxides other than the particular organic peroxides of the present invention as described above cannot be roll-blended with IIR and a thermally or dynamically unstable compound which cannot be applieds to the present invention. Methacrylic compounds, 1,2-polybutadiene, polyfunctional aryl type compounds and polyfunctional acrylic acid esters, known as a cross-linking assistant in the organic peroxide cross-linking of diene type rubbers or EPM, are not so effective for cross-linking even if jointly used with the particular organic peroxide of the present invention. A method of organic peroxide cross-linking IIR by the joint use of quinone dioximes or sulfur is known, but the quinone dioximes tend to discolor cross-linked products and thus are not suitable for sanitary articles.

The present invention takes a serious view of highly sanitary property and does not permit such toxicity as zinc or aluminum has. Naturally, other heavy metals or inorganic or organic compounds should be taken into consideration to confirm the sanitary property.

The cross-linking assistant used in the present invention is a maleimide compound having at least 2 maleimide groups in one molecule. A compound having only one maleimide group in one molecule is not preferable because of the low cross-linking efficiency.

Examples of the maleimide compound of the present invention are:

N,N'-phenylenebismaleimide

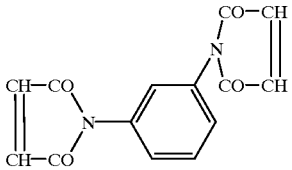

N,N'-p-phenylenebismaleimide
4-methyl-m-phenylene-bismaleimide (melting point 211–213° C.)
N,N'-hexanebismaleimide
cyxlohexane-1,4-bismaleimide (melting point 139–140° C.)
N,N'-ethylenediphenylbismaleimide (melting point 193–194° C.)
4,4'-diphenyl ether bismaleimide
2,2'-bis(4-maleimidephenyl)propane (melting point 227° C.)

bis(4-maleimidephenyl)phenylmethane (melting point 239° C.)

N,N'-methylene-di-p-phenylenebismaleimide (melting point 155–157° C.)

N,N'-(tetramethyl-m-bismaleimide)

1,1'-tetrafluoro-m-phenylenebismaleimide

Two or more compounds thereof can be used.

These maleimide compounds are known as a cross-linking assistant in the organic peroxide cross-linking of diene type rubbers such as natural rubber, styrene-butadiene rubbers (SBR), etc. ethylene-propylene rubbers (EPM), ethylene-propylene-non-conjugated diene ternary copolymers (EPDM) ["Rubber Chemistry and Technology" Vol. 35, page 520–535 (1962), Vol. 38, page 352–366 (1965), Japanese Patent Publication Nos. 38576/1972 and 13093/1983; and "Nippon Rubber Kyokaishi" Vol. 41, p.428–450 (1968)], and it has also been proposed to use the maleimide compounds for cross-linking chlorinated polyethylene, ethylene-propylene copolymer elastomer and EPDM, in addition to the low temperature vulcanization and bonding method of IIR (Japanese Patent Publication Nos. 22470/1981 and 13093/1983). That is, it is considered that a compound containing maleimide group is bonded to rubbers or resins containing double bonds, i.e. vinyl group, alkenyl group, isoprene group, isopentenyl group or halogens.

According to the present invention, IIR is cross-linked by the use of predetermined amounts of the above described particular organic peroxide and maleimide, whereby an excellent rubber article is accomplished capable of exhibiting the special rubber properties of IIR, the rubber article being free from eluted substance and fine grains, having less permeability of oxygen or humidity and having excellent sealability with the mouth of a vial.

In the rubber composition of the present invention, the content of a maleimide compound is preferably 0.3 to 3 parts by weight to 100 parts by weight of IIR, since if less than 0.3 part by weight, vulcanization does not take place and if more than 4 parts by weight, the sanitary property is not satisfied.

The maleimide compound used in the present invention is generally obtained by subjecting a diamine compound and 2 to 2.4 moles of maleic anhydride to ring-opening and addition reaction in an organic solvent such as acetone and then to dehydrating and cyclopolymerization in the presence of a basic catalyst or metal salt catalyst using a dehydrating agent (Japanese Patent Laid-Open Publication Nos. 53648/1978, 17317/1980, 293964/1986 and 126166/1987). The rubber composition of the present invention can be prepared by the use of a maleimide compound by any of sysnthesis methods, but it is important to use a pure material free from impurities and catalysts, obtained by purifying the maleimide compound with a solvent.

For IIR cross-linking according to the present invention, the joint use of the particular organic peroxide and the foregoing maleimide compound is essential and absence of anyone of them does not give a saniatry rubber article.

On the other hand, in the present invention, other cross-linking assistants can be jointly used with the foregoing cross-linking agents. As the other cross-linking agents, organosilicone compounds are particularly suitable.

That is, according to the present invention, it is found that elution of IIR from a sanitary rubber article can effectively be prevented by adding a specified amount of an organosilicone compound as the other cross-linking agent in addition to the foregoing maleimide compound to IIR, thereby bonding a larger amount of the maleimide compound, and the present invention has succeeded in, based on this finding, producing a rubber article having a suitable hardness and being excellent in sanitary property by applying the maleimide compound to an IIR rubber article for pharmaceuticals and effecting cross-linking with an organic peroxide.

As the organic silicone compound, further cross-linking assistant of the present invention, there can be used silane coupling agents such as bis(3-triethoxysilylpropyl) tetrasulfan, vinyltrismethoxysilane, vinyltriethoxysilane, vinyltris(β-methoxyethoxy)silane, γ-methacryloxypropyltrimethoxysilane, γ-glycidoxypropyltrimethoxysilane, γ-mercaptopropyltrimethoxysilane, etc., and polysiloxanes having the following recurring unit:

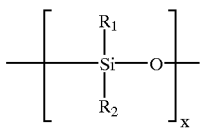

wherein $R_1$ and R2 each represent acryloyl group, vinyloxy group, alkyl group, aryl group, phenyl group, alkenyl group, hydrogen atom, hydroxyl group, mercapto group and epoxy group or modified polysiloxane compound (both the polysiloxane compounds will hereinafter be referred to as "polysiloxane compound"). As the polysiloxane compound, silicone rubbers and silicone resins can be used corresponding to the case where $R_1$ and $R_2$ are methyl groups or phenyl groups in the above described recurring unit.

In the present invention, at least one of the above described silane coupling agents and at least one of the above described polysiloxane compounds are preferably used in combination, as the organosilicone compound.

Particularly preferably, the total amount of the organosilicone compounds is 0.6 to 30 parts by weight to 100 parts by weight of IIR (0.7 to 40% by weight of the whole amount of the rubber composition of the present invention). If less than 0.6 part by weight, there is no effect as the cross-linking assistant and the adhesiveness of the cross-linked product is increased, which is not suitable, while if more than 30 parts by weight, the physical properties are deteriorated, for example, the tensile strength or elongation is decreased and the permeability of gases such as oxygen and air is increased. A particularly preferable composition comprises 0.6 to 5 parts by weight of the silane coupling agent and 1 to 20 parts by weight of the polysiloxane compound.

Furthermore, known additives to rubbers and resins, for example, trimercapto-s-triazine, dibutylamino-dimercapto-s-triazine, dibenzothiazyl disulfide, dilauryl thiodipropionate, 4,4'-thiobis(3-methyl-t-butylphenol), mercaptobenzimidazole, etc. can be added to the rubber composition of the present invention.

In the rubber composition of the present invention, further, reinforcing agents or fillers can be added thereto, for example, clays, silicas, clays surface-treated with ultra-high molecular weight resins and the like. However, calcium carbonate, carbon blacks, etc. are not preferable. These reinforcing agents or fillers are blended in a proportion of 5 to 35 parts by weight to 100 parts by weight of IIR, since if less than 5 parts by weight, the effect of addition thereof (improvement of workability, etc.) cannot be given, while if more than 35 parts by weight, stripping of fine grains from the surface of the product take place, which should be avoided.

The rubber article of the present invention has preferably a hardness (Hs) of 25 to 55, which is measured by subjecting a cross-linked rubber piece to a hardness tester of spring type according to [JIS K 6301] "Physical Test Method of Vulcanized Rubber" 5. Hardness Test, since if the hardness is less than 25, the rubber corresponds to non-vulcanized rubber and shows worse physical properties, while if more than 55, the physical properties, e.g. needle piercing property or chemical properties are not suitable as a sanitary rubber article. Thus, the above described range is preferable.

To the rubber article of the present invention can be added known working assistants such as stearic acid esters, coloring agents, pigments such as titanium oxide, cross-linking agents, etc. so as to improve the moldability and physical properties, in addition to the above described components. These additives should be present in such a proportion that the content of IIR be 55 to 87% by weight, preferably 62 to 80% by weight in the product. Since IIR is a soft rubber having a strong adhesiveness, the hardness (Hs) of 25 to 55 according to the present invention cannot be obtained even if the fillers or reinforcing agents are added unless it is cross-linked.

In a rubber article in which the particular organic peroxide is added to give an IIR content of 55 to 87% by weight, a sufficient elasticity enough to maintain a good sealability with the mouth of a vial and an excellent ageing resistance or compressive resistance can first be realized by the joint use of an organosilicone compound and maleimide compound, as a cross-linking aid, according to the present invention.

The rubber article of the present invention is generally produced by preparing raw materials according to the specified formulation of the present invention, blending the raw materials by a conventional rubber blending procedure, for example, using two rolls for rubber, internal mixer, etc. and then cross-linking and shaping by a method described in "Rubber Test Method" (edited by Nippon Gomu Kyokai, page 108–118). The thus shaped product is preferably subjected to trimming of the bur and after-treatment, i.e. washing with a solvent such as water, warm water, alkaline solutions, alcohols, etc. in conventional manner.

The following examples are given in order to illustrate the present invention in detail wihtout limiting the same.

EXAMPLES 1 to 7 and Comparative Examples 1 to 3

10 parts by weight of calcined clay [commercial name, Hydrite 10, made by Kaolin Co.] and 10 parts by weight of paraffin [melting point 110° F., made by Nippon Seiro KK] were added to 100 parts by weight of IIR [JSR BUTYL 365, made by Japan Synthetic Rubber Co., unsaturation degree 2.0 mol %, $ML_{1+8}$ 100° C. 42], to which organic peroxides, i.e. a) peroxyester type, b) peroxycarbonate type, c) peroxyketal type or a known organic peroxide and a maleimide compound were added, as shown in Table 1.

The blending procedure was carried out at a roll temperature of 60–90° C. according to SIRS [Nippon Gomu Kyokai Standard 3604 (1980)]. For comparison, compositions outside the present invention were similarly processed as shown in Table 1.

The blended composition was subjected to measurement of the torque by carrying out a vibration curing test [by giving a fine angular vibration (twisting vibration) of revolving and reciprocating movement, measuring the corresponding stress as a torque value and seeking the maximum torque value (c) to obtain the difference from the minimum torque value (b) according to "Nippon Gomu Kyokaishi" Vol. 40 (1967), p 874, ASTM D-2705, SRIS 3102, thus obtaining results as shown in Table 1.

TABLE 1

| Composition | | | | | | | |
|---|---|---|---|---|---|---|---|
| | Example | | | | | | |
| | 1 | 2 | 3 | 4 | 5 | 6 | 7 |
| Organic Peroxide | | | | | | | |
| a) t-Butylperoxyacetate | 1.3 | — | — | — | — | — | — |
| t-Butylperoxylaurate | — | 1.3 | — | — | — | — | — |
| b) t-Butylperoxyisopropyl carbonate | — | — | 1.3 | — | — | — | — |
| di(cyclohexylperoxy) carbonate | — | — | — | 1.3 | — | — | — |
| c) 1,1-di-t-Butylperoxy-cyclohexane | — | — | — | — | 1.3 | | |
| n-Butyl-4,4-bis(t-butyl) peroxyvalerate | | | | | | 1.3 | 1.3 |
| d) Dicumyl peroxide (DCP) | — | — | — | — | — | — | — |
| di-t-Butylperoxide | — | — | — | — | — | — | — |
| Maleimide | | | | | | | |
| N,N'-m-phenylenebismaleimide | — | — | — | — | — | — | 2 |
| Ethylenebismaleimide | 2 | 2 | 2 | 2 | 2 | 2 | — |
| Test Results | | | | | | | |
| ODR Test | | | | | | | |
| Scorch Time (min) | 1.9 | 2.0 | 1.4 | 1.5 | 1.9 | 2.1 | 2.2 |
| Cross-linking Time (min) | 4.7 | 5.3 | 2.1 | 4.5 | 6.5 | 3.4 | 3.6 |
| Torque Value (kg/cm) | | | | | | | |
| Minimum (b) | 9.8 | 10.0 | 10.3 | 9.9 | 9.5 | 9.2 | 8.9 |
| Maximum (c) | 21.0 | 20.4 | 19.5 | 17.8 | 21.4 | 18.0 | 17.5 |
| (b) - (c) | 11.2 | 10.4 | 9.2 | 7.9 | 11.9 | 8.8 | 8.6 |

TABLE 1-continued

Composition

Hardness of Cross-linked Rubber Piece (Hs)

| Cross-linking Conditions (170° C. × 10 min) | 36 | 32 | 31 | 26 | 37 | 30 | 28 |
|---|---|---|---|---|---|---|---|

|  |  | Comparative Example | | |
|---|---|---|---|---|
| Organic Peroxide | | 1 | 2 | 3 |
| a) | t-Butylperoxyacetate | — | — | — |
|  | t-Butylperoxylaurate | — | — | — |
| b) | t-Butylperoxyisopropyl carbonate | — | — | — |
|  | di(cyclohexylperoxy) carbonate | — | — | — |
| c) | 1,1-di-t-Butylperoxy-cyclohexane | — | — | — |
|  | n-Butyl-4,4-bis(t-butyl) peroxyvalerate | — | — | — |
| d) | Dicumyl peroxide (DCP) | — | 1.3 | 1.3 |
|  | di-t-Butylperoxide | 1.3 | — | — |
| Maleimide | | | | |
| N,N'-m-phenylenebismaleimide | | — | — | — |
| Ethylenebismaleimide | | 2 | 2 | — |
| Test Results | | | | |
| ODR Test | | | | |
| Scorch Time (min) | | 5.0 | 2.1 | 1.4 |
| Cross-linking Time (min) | | 9.7 | 3.3 | 5.1 |
| Torque Value (kg/cm) | | | | |
| Minimum (b) | | 8.0 | 9.1 | 8.7 |
| Maximum (c) | | 12.8 | 15.9 | 11.2 |
| (b) - (c) | | 4.8 | 6.8 | 2.5 |
| Hardness of Cross-linked Rubber Piece (Hs) | | | | |
| Cross-linking Conditions (170° C. × 10 min) | | 18 | 19 | less than 15 |

As shown in Table 1, the organic peroxide compounds a), b) and c) of Examples 1 to 7 give larger differences of the torques [(c)–(b)] and larger hardnesses of cross-linked rubber pieces by the joint use of maleimide compounds, but DCP alone (Comparative Example 3) or in combination with a maleimide compound (Comparative Example 2) gives a smaller difference of the torques [(c)–(b)], a smaller torque value through excessive cross-linking and a softer cross-linked rubber piece. FIG. 1 is a graph showing the results of cross-linking tests of O.D.R. to compare Example 2 of the present invention and Comparative Example 2, the abscissa being time (min) and the ordinate being torque value (kg/cm).

Some of organic peroxides cannot be stored at room temperature and ordinary state and these organic peroxides cannot be applied to the present invention even if they belong to those of a), b) and c) types.

Examples 8 to 11 and Comparative Examples 4 to 11

Example 1 was repeated except changing the organic peroxide of peroxyester type a) and bismaleimide compound, and the amounts thereof blended as shown in Table 2. The blending procedure of rubber, O.D.R. and hardness test method of cross-linked rubber pieces were carried out in the similar manner to Example 1.

TABLE 2

|  | Example | | | | Comparative Example | |
|---|---|---|---|---|---|---|
| Components blended with IIR | 8 | 9 | 10 | 11 | 4 | 5 |
| t-Butylperoxybenzoate *1 | 1.2 | — | — | — | 1.2 | 1.2 |
| 1,1-Di-t-butylperoxycyclo-hexane *2 | — | 2 | 2 | 2 | — | — |
| N,N'-m-phenylenebismaleimide *3 | — | 0.8 | 1.2 | 1.2 | — | — |
| p,p'-Diphenylbismaleimide *4 | 2.0 | 0.8 | — | — | 0.2 | 4.5 |
| γ-Mercaptotrimethoxysilane *5 | — | 1.2 | 1.0 | — | — | — |
| Powdered Silicone Rubber *6 | — | — | — | 0.5 | — | — |

TABLE 2-continued

| Components blended with IIR | | | | | | |
|---|---|---|---|---|---|---|
| Titanium Oxide *7 | — | — | 5 | 5 | — | — |
| Ultrahigh Molecular Weight Polyethylene Powder *8 | — | — | — | 10 | — | — |
| Carbon Black *9 | — | — | — | — | — | — |
| Process Oil *10 | — | — | — | — | — | — |
| Ethylene Glycol Dimethacrylate *11 | — | — | — | — | — | — |
| Test Results ODR Test Torque Value (kg/cm) | | | | | | |
| Minimum (b) | 8.2 | 8.4 | 8.9 | 8.6 | 7.7 | 7.6 |
| Maximum (c) | 17.3 | 19.1 | 20.3 | 21.5 | 12.2 | 18.6 |
| (b) - (c) | 9.1 | 10.7 | 11.4 | 12.9 | 4.5 | 11.0 |
| Hardness of Cross-linked Rubber Piece (Hs) | | | | | | |
| Cross-linking Conditions (170° C. × 10 min) | 27 | 29 | 31 | 32 | less than 15 | 35 |

| | Comparative Example | | | | | |
|---|---|---|---|---|---|---|
| Components blended with IIR | 6 | 7 | 8 | 9 | 10 | 11 |
| t-Butylperoxybenzoate *1 | 0.2 | 5.0 | 5.0 | 0.2 | 1.2 | 1.2 |
| 1,1-Di-t-butylperoxycyclo-hexane *2 | — | — | — | — | — | — |
| N,N'-m-phenylenebismaleimide *3 | — | — | — | — | — | — |
| p,p'-Diphenylbismaleimide *4 | 2.0 | 2.0 | 4.5 | 0.2 | 2.0 | 2.0 |
| δ-Mercaptotrimethoxysilane *5 | — | — | — | — | — | — |
| Powdered Silicone Rubber *6 | — | — | — | — | — | — |
| Titanium Oxide *7 | — | — | — | — | — | 5 |
| Ultrahigh Molecular Weight Polyethylene Powder *8 | — | — | — | — | — | — |
| Carbon Black *9 | — | — | — | — | 50 | — |
| Process Oil *10 | — | — | — | — | 5 | — |
| Ethylene Glycol Dimethacrylate *11 | — | — | — | — | — | 5 |
| Test Results ODR Test Torque Value (kg/cm) | | | | | | |
| Minimum (b) | 7.8 | 8.0 | 10.2 | 7.5 | 10.8 | 8.3 |
| Maximum (c) | 10.8 | 19.7 | 21.8 | 10.2 | 24.6 | 16.0 |
| (b) - (c) | 3.0 | 11.7 | 11.6 | 2.7 | 13.8 | 7.7 |
| Hardness of Cross-linked Rubber Piece (Hs) | | | | | | |
| Cross-linking Conditions (170° C. × 10 min) | <15 | 36 | 39 | at most 15 | <15 | 25 |

*1 to *11 in Table 2 are as follows:
*1 commercial name Perbutyl Z, made by Nippon Yushi KK

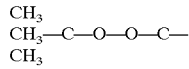

*2 commercial name Perhexa C, made by Nippon Yushi KK

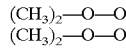

*3 solvent, recrystallized, MP 204° C., light yellow powder
*4 solvent, washed product, MP 346° C., light yellow powder
*5 δ-Mercaptotrimethoxysilane A-189 -commercial name- made by Nippon Unica
*6 powdered silicone rubber, small amounts of OH group, vinyl group (about 3%), methyl group/phenyl group = ¼, molecular weight about $3 \times 10^4$
*7 titanium oxide rutile type, made by Ishihara Sangyo
*8 ultrahigh molecular weight polyethylene powder, commercial name Hizex Million 240 M, Mitsui Sekiyu Kagaku KK
*9 carbon black, commercial name Seast No. 3, made by Tokai Denkyoku KK
*10 process oil, commercial name Kyoseki Process Oil P-200 made by Kyodo Sekiyu KK
*11 ethylene glycol dimethacrylate, commercial name Acryester ED made by Mitsubishi Rayon KK As shown in Table 2, the torque values are increased by cross-linking IIR with an organic peroxide and maleimide compound (Example 8), by the joint use of a silane coupling agent (Example 9) or a white pigment and silicone rubber (Example 10) and by the joint use of a high molecular weight resin (Example 11).

Even when using the particular organic peroxide, however, in the case of reducing the amount thereof used (Comparative Examples 4, 6 and 9), the difference of torques [(c)–(b)] is smaller and the cross-linked rubber piece is softer. Even when using a cross-linking aid of methacrylate type (Example 11), the cross-linking effect is small.

Rubber stoppers for pharmaceuticals were molded using the rubbers obtained in Examples 8 to 11 and Comparative Examples 5, 7, 8 and 10 and subjected to the test according to JP 11 and a special saniatry test. The results are shown in Table 3:

TABLE 3

| JIS Cross-linking Properties | Example | | | | Standard of JP11, DIN, etc. |
|---|---|---|---|---|---|
| | 8 | 9 | 10 | 11 | |
| 100% Tensile Strength (kg/cm$^2$) | 25 | 26 | 27 | 28 | — |
| Tensile Strength (kg/cm$^2$) | 132 | 134 | 142 | 153 | — |
| Elongation (%) | 640 | 610 | 590 | 580 | — |
| JP 11 Test | | | | | |
| Property (%) | 99.5 | 99.5 | 99.5 | 99.5 | ≧99.0 |
| Bubbling (bubble extinguishing time, min) | <2 | <2 | <2 | <2 | ≦3 min |
| pH | 0.6 | 0.8 | 0.6 | 0.9 | ≦1.0 *1 |
| Zn (ppm) | <1 | <1 | <1 | <1 | ≦1 |
| KMnO$_4$ Reducing Property (ml) | 1.3 | 1.5 | 1.6 | 1.6 | ≦2.0 |
| Evaporation Residue (mg) | 1.5 | 1.3 | 1.6 | 1.7 | ≦2.0 mg |
| UV Absorption Spectrum | 0.12 | 0.10 | 0.09 | 0.13 | ≦0.2 *2 |
| Acute Toxicity Test | OK | OK | OK | OK | nothing unusual |
| Feverish Test | OK | OK | OK | OK | No |
| Hemolytic Test | OK | OK | OK | OK | No |
| DIN Test | | | | | |
| Pb (ppm) | <0.2 | <0.2 | <0.2 | <0.2 | ≦0.01 mg |
| Ga (ppm) | <0.5 | <0.5 | <0.5 | <0.5 | — |
| Mg (ppm) | <0.5 | <0.5 | <0.5 | <0.5 | — |
| Special Sanitary Test | | | | | |
| Sulfides (ppm) | <1 | <2 | <2 | <2 | *3 |
| Amount of Fine Grains (number of at least 5 μm) | 5 | 6 | 6 | 8 | — |
| Rubber Fragmentation (number) | 0 | 0 | 0 | 0 | <3 *4 |
| Leakage of Liquid (ml) | 0 | 0 | 0 | 0 | — |
| Water Repellency | No | No | No | No | — |
| Determination Penetrability (kg) | 0.3 | 0.3 | 0.3 | 0.3 | — |
| Steam Permeability (g) | 0.4 | 0.5 | 0.5 | 0.6 | — |
| Gas in Head Space | little | little | little | little | — |
| Alkaline Solution Resistance Test (%) | 99 | 99 | 99 | 99 | — |
| Amount of Water Absorption (%) | 0.1 | 0.2 | 0.1 | 0.2 | — |
| Adsorption Test of Liquid | 1.2 | 1.3 | 1.1 | 1.3 | — |

| JIS Cross-linking Properties | Comparative Example | | | | Standard of JP11, DIN, etc. |
|---|---|---|---|---|---|
| | 5 | 7 | 8 | 9 | |
| 100% Tensile Strength (kg/cm$^2$) | 23 | 21 | 30 | 53 | — |
| Tensile Strength (kg/cm$^2$) | 68 | 82 | 170 | 210 | — |
| Elongation (%) | 670 | 660 | 590 | 550 | — |
| JP 11 Test | | | | | |
| Property (%) | 96.0 | 98.0 | 98.0 | 93.0 | ≦99.0 |
| Bubbling (bubble extinguishing time, min) | 4 | 3 | 3 | 3 | ≦3 min |
| pH | 1.8 | 1.2 | 1.1 | 2.1 | ≦1.0 *1 |
| Zn (ppm) | <2 | <2 | <2 | <2 | ≦1 |
| KMnO$_4$ Reducing Property (ml) | 3.2 | 2.5 | 2.1 | 2.1 | ≦2.0 |
| Evaporation Residue (mg) | 3.8 | 3.0 | 2.5 | 4.2 | ≦2.0 mg |
| UV Absorption Spectrum | 0.4 | 0.2 | 0.2 | 0.3 | ≦0.2 *2 |
| Acute Toxicity Test | no test | no test | no test | no test | nothing unusual |
| Feverish Test | no test | no test | no test | no test | No |
| Hemolytic Test | no test | no tset | no test | no test | No |
| DIN Test | | | | | |
| Pb (ppm) | 21 0.5 | <0.5 | <0.5 | <1 | ≦0.01 mg |
| Ca (ppm) | <1 | <1 | <1 | <2 | — |
| Mg (ppm) | <1 | <1 | <1 | <1 | — |
| Special Sanitary Test | | | | | |
| Sulfides (ppm) | <5 | <5 | <5 | <5 | *3 |
| Amount of Fine Grains | | | | | |

TABLE 3-continued

| | | | | | |
|---|---|---|---|---|---|
| (number of at least 5 μm) | 20 | 12 | 17 | 38 | — |
| Rubber Fragmentation (number) | 11 | 8 | 14 | 9 | <3 *4 |
| Leakage of Liquid (ml) | 20 | 28 | 10 | 8 | — |
| Water Repellency | No | No | No | No | — |
| Determination Penetrability (kg) | 0.4 | 0.3 | 0.7 | 0.9 | — |
| Steam Permeability (g) | 2.5 | 3.6 | 1.2 | 0.8 | — |
| Gas in Head Space | medium | medium | medium | medium | — |
| Alkaline Solution Resistance Test (%) | 95 | 94 | 92 | 88 | — |
| Amount of Water Absorption (%) | 0.7 | 0.6 | 0.4 | 0.4 | — |
| Adsorption Test of Liquid | 2.1 | 1.7 | 1.8 | 2.5 | — |

Note:
*1 difference from blank; *2 wavelength 220–350 nm;
*3 DIN Standard $Na_2S$ 0.05 ml/20 $cm^2$; *4 BS Standard The details of the tests shown in Table 3 are illustrated below:

JP 11 Test

Property of Elution Test, Bubbling, pH, Zn, $KMnO_4$ Reducing Property, Evaporation Residue, UV (ultraviolet ray) Absorption Spectrum A sample is mixed with water in an amount of 10 times as much as the sample and then heated and extracted with high pressure steam at 121° C. for 1 hour. In view of that DIN or BS is carried out by heating at 121° C. for 30 minutes, it is apparent that the extraction condition of JP 11 is the severest.

Acute Toxicity Test, Feverish Test, Hemolytic Test

These tests are carried out according to JP 11, which are somewhat different from those of DIN, BS or USP.

DIN Test

Detection Test of Metallic Elements (Pb, Ca, Mg)

30% $HNO_3$ is added to 10.0 ml of the test solution obtained in an analogous manner to the elution test of JP 11 to 20 ml and subjected to measurement of the metallic elements by an atomic absorption spectrophotometric method using acetylene. Pb is measured by a hollow vacuum lamp 283.3 μm, Ca by 422.7 μm and and Mg by 285.2 μm.

Sulfide Test

A rubber stopper corresponding to a surface area of 20 $cm^2$ is charged in an Erlenmeyer flask of 100 ml, to which 2 wt % citric acdi is added to give a volume of 5 ml. A lead acetate paper is placed in the flask, covered with a measuring dish, steam-heated at 121±1° C. in a pressure vessel and subjected to colorimetry of discoloration (balck) of the lead acetate paper. When using an organic peroxide as a cross-linking agent, sulfur can be used as a cross-linking assistant, but in this case, black discoloration take place in the test.

Other Special Sanitary Test

Amount of Fine Grains (Test of Amount of Grains from Rubber Stopper)

10 rubber stoppers are charged in a hard glass bottle, to which 300 ml of dust-free water is added, and the mouth of the bottle is wrapped with a film and vibrated by hand at 2 revolutions per second for 20 seconds. Allowing to stand for 1 hour, the number of fine grains in the water was measured by means of an automatic fine grain meter of light-shielding type (made by MIAC Co.). The presence of fine grains with a grain size of at least 5 μm in an injection liquor is an important item because of causing a problem of clogging blood vessel, etc.

Fragmentation of Rubber

Figure 2:
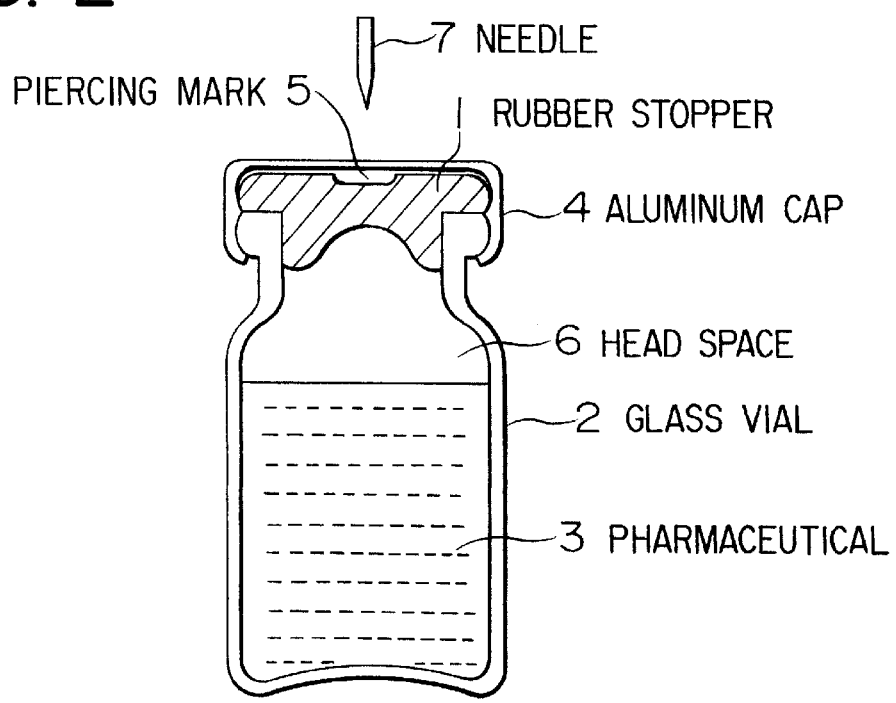
FIG. 2 is a cross-sectional view of one embodiment of the rubber article of the present invention, i.e. a rubber stopper enclosed in a glass bottle and fastened by an aluminum cap.

A vial of 10 ml, having a shape shown in FIG. 2 as a designation 2, is charged with 5 ml of water, closed by a rubber stopper 1 and then fastened by an aluminum cap 4. An injection cylinder fitted with a test needle [22 G (0.70×32 mm)] is charged with water and then pierced through a piercing position 5 20 times. At the 20th penetration, the water in the injection cyclinder is injected into the vial and the needle is then withdrawn. After vibrating the vial, the rubber stopper is removed, the content liquid is filtered and the number of rubber fragments on the filter paper is counted. This test method is an improved method of BS. BS provides that the number of rubber fragments be at most 3, but in this field, it has lately been desired that it should be at most 2.

Leakage of Medical Liquor

A vial 2 of FIG. 2 is charged with 500 ml of water, enclosed by a rubber stopper 1 and fastened by an aluminum cap 4. After this assembly is heated at 121° C. for 30 minutes in a vessel, a rocket needle (JMS No. 200, rocket needle fitted with a liquid transfusion set) is pierced through a piercing position 5, allowed to stand for 1 hour while maintianing inverted, then an air needle is pierced to drain out 400 ml of the water in the vial, after which the rocket needle is withdrawn from the rubber stopper, and during the same time, leakage of the water (ml) is observed and measured.

Water Repellency

A vial 2 of FIG. 2 is charged with 500 ml of distilled water, enclosed by a rubber stopper 1 and fastened by an aluminum cap 4. This assembly is then charged in a pressure-resisting heating vessel, steam-heated at 121° C. for 30 minutes, allowed to stand at room temperature for 24 hours and the inner wall of the vial is observed. When no water drop is observed during the same time, this sample is regarded as satisfying the standard. This test is carried out to check whether some rubber working assistants of rubber addtives has water repellency.

Determination of Penetrability

When an injection needle 7 (21 S.W.G., outer diameter 0.81 mm, length 38 mm) is pierced through the rubber stopper at a rate of 20 cm/min, the force required therefor is measured. When the force is 0.5 kg, this sample is regarded as satisfying the standard. This test method is an improved method of BS. BS provides 1000 g or less.

Steam Permeability

A vial 2 of FIG. 2 is charged with 8 ml of a 2 wt % aqueous solution of NaCl, enclosed by a rubber stopper 1 and fastened by an aluminum cap 4. This assembly is then stored at room temperature for 6 months in desiccator charged with silica gel and change of the weight is then measured to obtain the amount of steam permeability (g) of the rubber stopper. Taking an average value of the 5 samples, 1 g or less is regarded as satifactory. This test is an independent standard test.

Gas Component Test in Head Space

A vial 2 of FIG. 2 is charged with 8 ml of a 2 wt % aqueous solution of NaCl, enclosed by a rubber stopper 1 and fastened by an aluminum cap 4. This glass vial is steam-heated at 121±1° C. for 60 minutes in a pressure vessel and then allowed to stand for about 10 hours. 5 ml of a sample gas is taken from a head space 6 of the vial using a syringe for gases and then subjected to analysis by a gas chromatography under conditions of column 10% OV-101 (180–200 mesh WHP), carrier gas He 50 ml/min and column temperature 100–200° C. (raised at 4° C. /min), thus checking the presence or height of peaks. This is a test for checking generation of gases in very small amounts from the rubber and additives to be blended.

Alkaline Solution Resistance Test 10 rubber stoppers are charged in an alkali resistance vessel, to which a 0.5 wt % solution of sodium carbonate is added in a proportion of 10 times as much as the weight of the rubber stoppers, and the vessel is enclosed by the rubber stopper and fastened by an aluminum cap. This assembly is then steam-heated at 121° C. for 30 minutes in a high pressure vessel, allowed to stand to room temperature and cooled, followed by removing the rubber stopper. The test solution is taken and subjected to measurement of transmission of a visible part with a wavelength of 430 to 650 nm using a quartz cell. A transmission of at least 95% is regarded as satisfactory. This test is a fundamental test for examining the relationship between the rubber and a medical liquid and a rubber article having a low percent permeability cannot pass this test.

Water Absorption Test

A cross-linked and shaped rubber article is dried at 105° C. at normal pressure for 3 hours, allowed to stand in a desiccator containing a drying agent for about 1 hour and the weight thereof (A) is then precisely measured. Then, the rubber stopper is immersed in purified water in an amount of 10 times as much as the rubber stopper and steam-heated, as it is, at 121±1° C. for 30 minutes in a pressure vessel. After cooling, only the rubber stopper is allowed to stand for 30 minutes in a desiccator to remove the water on the surface, at which the weight (B) thereof is measured. Thus, $\{[(B)-(A)/(A)]\times 100\}$ (%) is calculated and a value of at most 2% by weight is regarded as passing this test.

Adsorption Test of Medical Liquor

Isosorbit nitrate (drug for ischemic cardiac disease, MP 72° C., made by Nippon Seiyaku KK) is diluted with a physiological salt solution to 0.040% by weight. 3 ml of this solution is correctly charged in a glass vial 2 of 10 ml, shown in FIG. 2, enclosed by a rubber stopper 1, fastened by an aluminum cap 4 and allowed to stand under inverted state for 24 hours. This solution is subjected to analysis by high speed liquid chromatography under conditions of column : FINEPAK SILC 18 (made by Nippon Bunko KK), moving phase methanol:water=7:3, flow rate: 1 ml/min, detection device: UVIDEC 100-IV (220 nm, made by Nippon Bunko KK), thus measuring the quantity of the isosorbit nitrate and obtaining a reduced quantity due to the adsorption.

As shown in Table 3, the articles of the present invention (Examples 8, 9, 10 and 11) are softer than the comparative articles (Comparative Examples 8 and 10), each having a smaller tensile stress and tensile strength. Comparative Examples 8 and 10 do not pass the special sanitary test. When the content of either of the particular organic peroxide and maleimide compound is outside the specified scope by the present invention, the article does not pass the test.

On the other hand, the articles of the present invention have better properties in the items of JP 11 and Special Sanitary Test and in particular, are more excellent in each of the items of Special Sanitary Test, which have lately been considered important, than the comparative articles of the prior art.

Examples 12 to 16 and Comparative Examples 12 to 34

As shown in the following Table 4, a) IIR, b) organosilicone compounds, c) maleimide compounds, d) organic peroxides and e) reinforcing agents, fillers and other addtives are blended and processed at a roll temperature of 60 to 90° C. according to SRIS (Nippon Gomu Kyokai Standard) 3604 (1980). Comparative compositions outside the scope of the pressent invention are similarly processed.

The O.D.R. cross-linking test results of the blended compositions are also shown in Table 4. Each of the cross-linked and shaped rubber pieces is subjected to measurement of the hardness (Hs) of spring system according to JIS-K6301 to obtain results shown in Table 4.

TABLE 4

| Composition (parts) | Example | | | | |
|---|---|---|---|---|---|
| | 12 | 13 | 14 | 15 | 16 |
| a) IIR *1 | 100 | 100 | 100 | 100 | 100 |
| b) Silane Coupling Agent *2 | — | 0.5 | — | 1.5 | 1 |
| Silicone Rubber *4 | 15 | — | 25 | — | 10 |
| Other Silicone Compound *5 | — | 7 *3 | — | 15 | — |
| c) N,N'-Phenylene-bismaleimide *7 | 1.5 | — | 0.8 | 1.2 | 1.0 |
| Other Maleimide Compound | — | 2.0 *8 | 0.8 *9 | — | — |
| d) t-Butylperoxyisopropyl *10 | 1.5 | — | 1.5 | — | 1.0 |
| Other Organic Peroxide *11 | — | 2.0 | — | 1.2 | — |
| e) Calcined Clay *12 | 15 | 15 | — | 15 | 25 |
| Other Blending Agent *14, 15, 16 | — | — | 18 *14 | 3 *15 | — |
| Low Density Polyethylene *17 | 1 | 1 | — | 1 | 1 |
| Content of IIR in Whole Composition | 74.6 | 78.4 | 68.4 | 72.5 | 71.9 |

TABLE 4-continued

| Test Results ODR Test Torque Value (kg/cm) | | | | | |
|---|---|---|---|---|---|
| Minimum (b) | 10.0 | 9.7 | 10.2 | 9.8 | 10.3 |
| Maximum (c) | 29.3 | 28.7 | 31.3 | 30.2 | 32.2 |
| (b) - (c) | 19.3 | 19.0 | 21.1 | 20.4 | 22.2 |
| Temperature (° C.) | 150 | 150 | 150 | 150 | 150 |
| JIS K 6301 Hardness of Cross-linked Rubber Piece (Hs) Cross-linking Conditions | 30 | 33 | 35 | 34 | 32 |

(150° C. × 15 min)

| | Comparative Example | | | | | |
|---|---|---|---|---|---|---|
| Composition (parts) | 12 | 13 | 14 | 15 | 16 | 17 |
| a) IIR *1 | 100 | 100 | 100 | 100 | 100 | 100 |
| b) Silane Coupling Agent *2 | — | — | — | — | — | — |
| Silicone Rubber *4 | — | 15 | 40 | 40 | 40 | 40 |
| Other Silicone Compound *5 | 15 *6 | — | — | — | — | — |
| c) N,N'-Phenylene-bismaleimide *7 | 1.2 | 1.2 | 4 | 4 | 0.2 | 0.2 |
| Other Maleimide Compound | — | — | — | — | — | — |
| d) t-Butylperoxyisopropyl *10 | 1.2 | 1.2 | 4 | 0.2 | 4 | 0.2 |
| Other Organic Peroxide *11 | — | — | — | — | — | — |
| e) Calcined Clay *12 | 15 | 40 *13 | 15 | 15 | 15 | 15 |
| Other Blending Agent *14, 15, 16 | — | 30 *16 | — | — | — | — |
| Low Density Polyethylene *17 | 1 | 5 *18 | 1 | 1 | 1 | 1 |
| Content of IIR in Whole Composition | 75.0 | 52.0 | 61.0 | 62.4 | 62.4 | 63.9 |
| Test Results ODR Test Torque Value (kg/cm) | | | | | | |
| Minimum (b) | 9.5 | 16.3 | 20.3 | 12.5 | 12.6 | 12.7 |
| Maximum (c) | 9.7 | 60.5 | 38.3 | 12.7 | 13.0 | 12.5 |
| (b) - (c) | -0.2 | 44.2 | 18.0 | -0.2 | 0.4 | -0.2 |
| Temperature (° C.) | 160 | 150 | 150 | 160 | 160 | 160 |
| JIS K 6301 Hardness of Cross-linked Rubber Piece (Hs) | | | | | | |
| Cross-linking Conditions (150° C. × 15 min) | <15 | 60 | 63 | <15 | <15 | <15 |

| | Comparative Example | | | | | |
|---|---|---|---|---|---|---|
| Composition (parts) | 18 | 19 | 20 | 21 | 22 | 23 |
| a) IIR *1 | 100 | 100 | 100 | 100 | 100 | 100 |
| b) Silane Coupling Agent *2 | — | — | — | — | — | — |
| Silicone Rubber *4 | 0.2 | 0.2 | 0.2 | 0.2 | 40 | 40 |
| Other Silicone Compound *5 | — | — | — | — | — | — |
| c) N,N'-Phenylene-bismaleimide *7 | 4 | 4 | 0.2 | 0.2 | 4 | 0.2 |
| Other Maleimide Compound | — | — | — | — | — | — |
| d) t-Butylperoxyisopropyl *10 | 4 | 0.2 | 4 | 0.2 | 1.5 | 1.5 |
| Other Organic Peroxide *11 | — | — | — | — | — | — |
| e) Calcined Clay *12 | 15 | 15 | 15 | 15 | 15 | 15 |
| Other Blending Agent *14, 15, 16 | — | — | — | — | — | — |
| Low Density Polyethylene *17 | 1 | 1 | 1 | 1 | 1 | 1 |
| Content of IIR in Whole Composition | 82.9 | 83.1 | 85.6 | 85.8 | 61.9 | 63.4 |
| Test Results ODR Test Torque Value (kg/cm) | | | | | | |
| Minimum (b) | 10.2 | 10.3 | 10.1 | 10.3 | 20.0 | 20.0 |
| Maximum (c) | 21.7 | 10.3 | 9.6 | 10.3 | 34.5 | 26.0 |
| (b) - (c) | 11.5 | 0 | -0.5 | 0 | 14.5 | 6.0 |
| Temperature (° C.) | 160 | 160 | 160 | 160 | 150 | 160 |
| JIS K 6301 | | | | | | |

TABLE 4-continued

| Hardness of Cross-linked Rubber Piece (Hs) | | | | | | |
|---|---|---|---|---|---|---|
| Cross-linking Conditions (150° C. × 15 min) | 26 | <15 | <15 | <15 | 78 | 65 |

| | Comparative Example | | | | | |
|---|---|---|---|---|---|---|
| Composition (parts) | 24 | 25 | 26 | 27 | 28 | 29 |
| a) IIR *1 | 100 | 100 | 100 | 100 | 100 | 100 |
| b) Silane Coupling Agent *2 | — | — | — | — | — | — |
| Silicone Rubber *4 | 40 | 40 | 40 | 0.2 | 0.2 | 0.2 |
| Other Silicone Compound *5 | — | — | — | — | — | — |
| c) N,N'-Phenylene-bismaleimide *7 | 1.5 | 1.5 | 1.5 | 5 | 0.2 | 1.5 |
| Other Maleimide Compound | — | — | — | — | — | — |
| d) t-Butylperoxyisopropyl *10 | 4 | 0.2 | 1.5 | 1.5 | 1.5 | 4 |
| Other Organic Peroxide *11 | — | — | — | — | — | — |
| e) Calcined Clay *12 | 15 | 15 | 15 | 15 | 15 | 15 |
| Other Blending Agent *14, 15, 16 | — | — | — | — | — | — |
| Low Density Polyethylene *17 | 1 | 1 | 1 | 1 | 1 | 1 |
| Content of IIR in Whole Composition | 61.9 | 63.4 | 63.0 | 82.2 | 84.8 | 82.2 |
| Test Results ODR Test Torque Value (kg/cm) | | | | | | |
| Minimum (b) | 20.5 | 21.5 | 22.5 | 10.2 | 10.2 | 10.0 |
| Maximum (c) | 33.5 | 25.5 | 38.0 | 24.2 | 13.2 | 22.5 |
| (b) - (c) | 13 | 4.0 | 15.5 | 14.0 | 3.0 | 12.5 |
| Temperature (° C.) JIS K 6301 | 160 | 160 | 160 | 160 | 160 | 160 |
| Hardness of Cross-linked Rubber Piece (Hs) | | | | | | |
| Cross-linking Conditions (150° C. × 15 min) | 68 | 83 | 80 | 28 | <15 | 26 |

| | Comparative Example | | | | |
|---|---|---|---|---|---|
| Composition (parts) | 30 | 31 | 32 | 33 | 34 |
| a) IIR *1 | 100 | 100 | 100 | 100 | 100 |
| b Silane Coupling Agent *2 | — | — | — | — | — |
| Silicone Rubber *4 | 0.2 | 15 | 15 | 15 | 15 |
| Other Silicone Compound *5 | — | — | — | — | — |
| c) N,N'-Phenylene-bismaleimide *7 | 1.5 | 5 | 0.2 | 1.5 | 1.5 |
| Other Maleimide Compound | — | — | — | — | — |
| d) t-Butylperoxyisopropyl *10 | 0.2 | 1.5 | 1.5 | 4 | 0.2 |
| Other Organic Peroxide *11 | — | — | — | — | — |
| e) Calcined Clay *12 | 15 | 15 | 15 | 15 | 15 |
| Other Blending Agent *14, 15, 16 | — | — | — | — | — |
| Low Density Polyethylene *17 | 1 | 1 | 1 | 1 | 1 |
| Content of IIR in Whole Composition | 82.5 | 73.3 | 75.4 | 74.6 | 75.4 |
| Test Results ODR Test Torque Value (kg/cm) | | | | | |
| Minimum (b) | 10.0 | 12.0 | 12.6 | 12.0 | 12.0 |
| Maximum (c) | 10.0 | 32.0 | 14.3 | 23.0 | 13.0 |
| (b) - (c) | 0 | 20.0 | 1.7 | 11.0 | 1.0 |
| Temperature (° C.) JIS K 6301 | 160 | 160 | 150 | 150 | 150 |
| Hardness of Cross-linked Rubber Piece (Hs) | | | | | |
| Cross-linking Conditions (150° C. × 15 min) | <15 | 48 | 29 | 38 | 32 |

The meanings of *1 to *18 in Table 4 are as follows:
*1 IIR: JSR BUTYL 365, made by Japan Synthetic Rubber Co., unsaturation degree 2.0 mol %, $M_{1+8}$, 100° C. 47

TABLE 4-continued

*2 vinyl-tris(δ-methoxyethoxy)silane, V-50000 -commercial name-, made by Chisso KK
*3 γ-mercaptotrimethoxysilane, A-189 -commercial name-, made by Nippon Unica KK
*4 polysiloxane with small amounts of hydroxyl groups and vinyl groups (about 5%), methyl group/phenyl group = ¼, molecular weight = about $5 \times 10^4$
*5 polysiloxane with acrylate groups (small amount), hydroxyl, methyl and phenyl groups, molecular weight about $1.5 \times 10^4$
*6 ethylene glycol dimethacrylate, Acrylester ED -commercial name-, made by Mitsubishi Rayon KK
*7 recrystallized in solvent, light-yellow powder, MP 204–250° C.
*8 cyclohexane-1,4-bismaleimide, purified product, light-yellow powder, MP 139–140° C.
*9 2,2'-bis(4-maleimidephenyl)propane, purified product, light-yellow powder, MP 227° C.
*10 t-butylperoxyisopropyl (commercial name, Perbutyl I, made by Nippon Yushi KK
*11 n-butyl-4,4'-bis(t-butylperoxide) valerate, Perhexa -commercial name-, made by Nippon Yushi KK
*12 Hydrite 10 -commercial name-, made bt Kalin Co.
*13 carbon black, Seast No. 3 -commercial name-, made by Tokai Denkyoku KK
*14 ultrahigh molecular weight polyethylene powder (commercial name, Hizexmillion 2401 M, made by Mitsui Sekiyu Kgaku KK
*15 titanium oxide, rutile type, made by Ishihara Sangyo KK
*16 soft calcium carbonate, Silver, made by Shiraishi Kogyo KK
*17 low density polyethylene, Showlex M 222 -commercial name-, made by Showa Denko KK
*18 process oil, Kyoseki Process P-200 -commercial name-, made by Kyodo Sekiyu KK As shown in Table 4, cross-linking of a) IIR with d) an organic peroxide is rendered possible by combining b) an organosilicone compound, i.e. a silane coupling agent and/or modified polysiloxane and c) a maleimide compound, but if either of the component c) or d) is lacking, the cross-linking of IIR is difficult. Since carbon black used in Comparative Example 13 has a large reinforcing force, it is generally applied to rubbers, but the use thereof for the sanitary rubber article of the present invention is not suitable because of the presence of very small amounts of toxic substances.

In the O.D.R. curing test, Examples 12 to 16 of the present invention all gave a torque of 10 kg/cm or more, and Comparative Examples 13, 14, 24, 26, 27, 29, 31 and 33 gave a torque of 10 kg/cm or more.

A rubber stopper for a vial as shown in FIG. 2 was prepared according to the formulations and cross-linking conditions of Examples 12, 14 and 16, and Comparative Examples 13, 14, 22, 25, 31 and 33. The rubber blending operation was carried out according to the method described in "Rubber Test Method" edited by Nippon Gomu Kyokai, page 170–200, the shaped and cross-linked rubber stopper was washed with a warm 1 wt % solution of caustic soda, then washed adequately with purified water, dried and subjected to the foregoing tests according to JP 11 and new tests according to the new test method, thus obtaining results as shown in Table 5.

TABLE 5

| JIS Cross-linking Properties | Example | | | Standard of JP11, DIN, etc. |
|---|---|---|---|---|
| | 12 | 14 | 16 | |
| 100% Tensile Strength (kg/cm²) | 23 | 28 | 25 | |
| Tensile Strength (kg/cm²) | 132 | 141 | | |
| Elongation (%) | 610 | 620 | 580 | |
| JP 11 Test | | | | |
| Property (%) | 99.5 | 99.5 | 99.5 | ≧99.0 |
| Bubbling (bubble extinguishing time, min) | <2 | <2 | <2 | ≦3 min |
| pH | 0.6 | 0.8 | 0.6 | ≦1.0 *1 |
| Zn (ppm) | <1 | <1 | <1 | ≦1 |
| KMnO₄ Reducing Property(ml) | 1.3 | 1.5 | 1.6 | ≦2.0 |
| Evaporation Residue (mg) | 1.8 | 1.7 | 1.5 | ≦2.0 mg |
| UV Absorption Spectrum | 0.12 | 0.10 | 0.09 | ≦0.2 *2 |
| Acute Toxicity Test | OK | OK | OK | nothing unusual |
| Feverish Test | OK | OK | OK | No |
| Hemolytic Test | OK | OK | OK | No |
| DIN Test | | | | |
| Pb (ppm) | <0.2 | <0.2 | <0.2 | ≦0.01 mg |
| Ca (ppm) | <0.5 | <0.5 | <0.5 | — |
| Mg (ppm) | <0.5 | <0.5 | <0.5 | — |
| Special Sanitary Test | | | | |
| Sulfides (ppm) | <2 | <2 | <2 | *3 |
| Amount of Fine Grains (number of at least 5 μm) | 5 | 6 | 8 | — |
| Rubber Fragmentation (number) | 0 | 0 | 0 | <3 *4 |
| Leakage of Liquid (ml) | 0 | 0 | 0 | — |
| Water Repellency | No | No | No | — |

TABLE 5-continued

| | | | | |
|---|---|---|---|---|
| Determination Penetrability (kg) | 0.3 | 0.3 | 0.3 | — |
| Steam Permeability (g) | 0.4 | 0.5 | 0.7 | — |
| Gas in Head Space | little | little | little | little |
| Alkaline Solution Resistance Test (%) | 99 | 99 | 99 | — |
| Amount of Water Absorption (%) | 0.1 | 0.2 | 0.2 | — |
| Adsorption Test of Liquid | 1.2 | 1.3 | 1.1 | — |

| JIS Cross-linking | Comparative Example | | | | Standard of |
|---|---|---|---|---|---|
| Properties | 13 | 14 | 22 | 24 | JP11, DIN, etc. |
| 100% Tensile Strength (kg/cm$^2$) | 86 | 160 | 10 | 29 | — |
| Tensile Strength (kg/cm$^2$) | 232 | 340 | 145 | 95 | — |
| Elongation (%) | 580 | 300 | 230 | 280 | — |
| JP 11 Test | | | | | |
| Property (%) | 87 | 88 | 93 | 90 | ≧99.0 |
| Bubbling (bubble extinguishing time, min) | 8 | 5 | 4 | 4 | ≦3 min |
| pH | 3.2 | 1.8 | 1.5 | 1.7 | ≦1.0 *1 |
| Zn (ppm) | <3 | <3 | <3 | <3 | ≦1 |
| KMnO$_4$ Reducing Property (ml) | 3.1 | 2.3 | 2.1 | 2.4 | ≦2.0 |
| Evaporation Residue (mg) | 4.0 | 2.3 | 2.1 | 2.0 | ≦2.0 mg |
| UV Absorption Spectrum | 0.31 | 0.21 | 0.23 | 0.21 | ≦0.2 *2 |
| Acute Toxicity Test | no test | no test | no test | no test | nothing unusual |
| Feverish Test | no test | no test | no test | no test | No |
| Hemolytic Test | no test | no tset | no test | no test | No |
| DIN Test | | | | | |
| Pb (ppm) | <2 | <2 | <1 | <1 | ≦0.01 mg |
| Ca (ppm) | <52 | <5 | <1 | <5 | — |
| Mg (ppm) | <3 | <1 | <1 | <1 | — |
| Special Sanitary Test | | | | | |
| Sulfides (ppm) | <5 | <5 | <5 | <5 | *3 |
| Amount of Fine Grains (number of at least 5 μm) | 215 | 112 | 73 | 83 | — |
| Rubber Fragmentation (number) | 18 | 10 | 13 | 12 | <3 *4 |
| Leakage of Liquid (ml) | 32 | 11 | 10 | 14 | — |
| Water Repellency | No | No | No | No | — |
| Determination Penetrability (kg) | 1.2 | 0.7 | 0.8 | 0.7 | — |
| Steam Permeability (g) | 1 | 5.6 | 4.8 | 5.2 | — |
| Gas in Head Space | medium | medium | medium | medium | — |
| Alkaline Solution Resistance Test (%) | 88 | 90 | 92 | 91 | — |
| Amount of Water Absorption (%) | 3.1 | 1.8 | 1.6 | 1.7 | — |
| Adsorption Test of Liquid | *2.1 | 1.7 | 1.6 | 1.6 | — |

| JJS Cross-linking | Comparative Example | | | Standard of |
|---|---|---|---|---|
| Properties | 26 | 31 | 33 | JP11, DIN, etc. |
| 100% Tensile Strength (kg/cm$^2$) | — | 16 | 25 | — |
| Tensile Strength (kg/cm$^2$) | 190 | 125 | 170 | — |
| Elongation (%) | 120 | 260 | 270 | — |
| JP 11 Test | | | | |
| Property (%) | 93 | 95 | 96 | ≧99.0 |
| Bubbling (bubble extinguishing time; min) | 5 | 3 | 3 | ≦3 min |
| pH | 2.0 | 1.3 | 1.4 | ≦1.0 *1 |
| Zn (ppm) | <3 | <3 | <3 | ≦1 |
| KMnO$_4$ Reducing Property (ml) | 2.3 | 2.0 | 1.9 | ≦2.0 |
| Evaporation Residue (mg) | 2.4 | 1.8 | 1.7 | ≦2.0 mg |
| UV Absorption Spectrum | 0.20 | 0.16 | 0.18 | ≦0.2 *2 |
| Acute Toxicity Test | no test | no test | no test | nothing unusual |
| Feverish Test | no test | no test | no test | No |
| Hemolytic Test | no test | no test | no test | No |
| DIN Test | | | | |
| Pb (ppm) | <1 | <1 | <1 | ≦0.01 mg |

TABLE 5-continued

| | | | | |
|---|---|---|---|---|
| Ca (ppm) | <5 | <5 | <5 | — |
| Mg (ppm) | <1 | <1 | <1 | — |
| Special Sanitary Test | | | | |
| Sulfides (ppm) | <5 | <5 | <5 | *3 |
| Amount of Fine Grains (number of at least 5 μm) | 63 | 51 | 48 | — |
| Rubber Fragmentation (number) | 14 | 8 | 6 | <3 *4 |
| Leakage of Liquid (ml) | 12 | 6 | 7 | — |
| Water Repellency | No | No | No | — |
| Determination Penetrability (kg) | 0.9 | 0.6 | 0.6 | — |
| Steam Permeability (g) | 4.3 | 2.1 | 2.1 | — |
| Gas in Head Space | medium | medium | medium | — |
| Alkaline Solution Resistance Test (%) | 93 | 95 | 96 | — |
| Amount of Water Absorption (%) | 1.8 | 1.2 | 1.3 | — |
| Adsorption Test of Liquid | 1.5 | 1.2 | 1.3 | — |

Note: *1 difference from blank; *2 wavelength 220–350 nm;
*3 DIN Standard $Na_2S$ 0.05 ml/20 $cm^2$; *4 BS Standard As shown in Table 5, the rubber articles of the present invention (Examples 12, 14 and 16) are softer than the comparative articles (Comparative Examples 13, 14, 22, 24, 26, 31 and 33) due to the polysiloxane rubbers. In the test items of JP 11 and Special Sanitary Test, however, all Examples of the present invention are superior to Comparative Examples. Further, it is apparent that the rubber articles of the present invention have more excellent results, in particular, in the special sanitary test, than the comparative articles of the prior art.

As illustrated above, according to the present invention, cross-linking and shaping of IIR is made possible and a rubber article with a hardness (Hs) of 25 to 55 can be realized by blending IIR with the particular organic peroxide and maleimide compound in predetermined amounts. Furthermore, a rubber article with a hardness (Hs, JIS spring system) of 25 to 55 can be obtained by effecting the cross-linking and shaping by the joint use of organosilicone compounds, preferably silane coupling agents and polysiloxane compounds with the above described organic peroxides and maleimide compounds.

The rubber article of the present invention is capable of widely developing possibility and application as a rubber article available for new pharmaceuticals or drugs, because of preventing containers or vessels for pharmaceuticals and medical devices from entrance of the outside air (air, oxygen), maintaining high sealability thereof, passing the various standards or offical provisions, e.g. JP 11, USP, ISO, EP, BS, DIN<etc. and further passing the new standards which have lately been considered important.

What is claimed is:

1. A rubber composition comprising 0.3 to 3.5 parts by weight of an organic peroxide cross-linking agent, 0.3 to 4 parts by weight of an organic compound having 2 maleimide groups in one molecule and 0.6 to 30 parts by weight of an organosilicone compound per 100 parts by weight of a isobutylene-isoprene copolymer rubber.

2. A rubber article for pharmaceuticals and medical treatment, which is obtained by shaping and cross-linking a rubber composition comprising 0.3 to 3.5 parts by weight of an organic peroxide cross-linking agent and 0.3 to 4 parts by weight of an organic compound having at least 2 maleimide groups in one molecule and 0.6 to 30 parts by weight of an organosilicone compound per 100 parts by weight of a isobutylene-isoprene copolymer rubber.

3. The rubber composition as claimed in claim 1, wherein the organosilicone compound consists of a silane coupling agent and polysiloxane compound in combination.

4. The rubber composition as claimed in claim 3, wherein the silane coupling agent and polysiloxane compound are present in a proportion of 0.6 to 5 parts by weight of the silane coupling agent and 1 to 20 parts by weight of the polysiloxane compound.

\* \* \* \* \*